(12) United States Patent
Yang et al.

(10) Patent No.: US 11,753,021 B2
(45) Date of Patent: Sep. 12, 2023

(54) TIRE PRESSURE MONITORING METHOD

(71) Applicant: HYUNDAI MOBIS CO., LTD., Seoul (KR)

(72) Inventors: Hae Jun Yang, Yongin-si (KR); Yong Hee Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 329 days.

(21) Appl. No.: 17/314,604

(22) Filed: May 7, 2021

(65) Prior Publication Data
US 2021/0347368 A1 Nov. 11, 2021

(30) Foreign Application Priority Data
May 8, 2020 (KR) .................. 10-2020-0055169

(51) Int. Cl.
*B60W 40/12* (2012.01)
*G01L 17/00* (2006.01)
*B60K 7/00* (2006.01)

(52) U.S. Cl.
CPC .......... *B60W 40/12* (2013.01); *G01L 17/00* (2013.01); *B60K 7/0007* (2013.01); *B60W 2510/081* (2013.01); *B60W 2510/083* (2013.01); *B60W 2510/182* (2013.01); *B60W 2520/10* (2013.01); *B60W 2520/125* (2013.01); *B60W 2530/10* (2013.01)

(58) Field of Classification Search
CPC .......... B60W 40/12; B60W 2510/081; B60W 2510/083; B60W 2510/182; B60W 2520/10; B60W 2520/125; B60W 2530/10; G01L 17/00; B60K 7/0007
USPC ....................................................... 701/32.5
See application file for complete search history.

(56) References Cited

U.S. PATENT DOCUMENTS

| | | | |
|---|---|---|---|
| 2007/0124053 A1* | 5/2007 | Lindskog | B60T 8/172 701/72 |
| 2017/0217261 A1* | 8/2017 | Mays | B60C 23/0486 |
| 2020/0215859 A1* | 7/2020 | Horikoshi | B60C 23/0486 |

* cited by examiner

*Primary Examiner* — Isaac G Smith
(74) *Attorney, Agent, or Firm* — MORGAN, LEWIS & BOCKIUS LLP

(57) ABSTRACT

The present disclosure may relate to a method capable of monitoring a tire pressure, and may include estimating a tire necessary air pressure based on a location and an external temperature of a vehicle, determining whether a change in a current applied to an in-wheel motor is included in a preset range, when the vehicle is driving at a uniform speed during a preset time, calculating weights according to a plurality of conditions, respectively, and calculating a tire pressure based on the weights.

16 Claims, 10 Drawing Sheets

TIRE PRESSURE MONITORING METHOD

CROSS-REFERENCE TO RELATED APPLICATION

This application claims the benefit of priority to Korean Patent Application No. 10-2020-0055169, filed in the Korean Intellectual Property Office on May 8, 2020, the entire contents of which are incorporated herein by reference.

TECHNICAL FIELD

The present disclosure relates to a method capable of monitoring a tire pressure of a vehicle including an in-wheel drive device.

BACKGROUND

A tire refers to an essential component that enables a vehicle not only to substantially drive during rotation of the tire while the tire supports a vehicle body, but also to stop the vehicle by using a frictional force with a ground during braking.

When tire pressure is insufficient, it adversely affects the driving safety of a vehicle.

When a vehicle is driving with a tire of a low air pressure, a probability that a tire is flat or is ruptured may increase. The punctures or ruptures in tires of a driving vehicle may lead to fatal accidents.

Accordingly, a device and system capable of monitoring a tire pressure, or a method thereof is being developed actively.

SUMMARY

The present disclosure has been made to solve the above-mentioned problems occurring in the prior art while advantages achieved by the prior art are maintained intact.

An aspect of the present disclosure provides a tire pressure monitoring method capable of monitoring a tire pressure without directly sensing a tire pressure.

An aspect of the present disclosure provides a tire pressure monitoring method capable of monitoring a tire pressure based on external environmental conditions, a driving road surface, a temperature of an in-wheel motor, and a current value applied to the in-wheel motor.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a tire pressure monitoring method may include estimating a tire necessary air pressure based on a location and an external temperature of a vehicle, determining whether a change in a current applied to an in-wheel motor is included in a preset range, when the vehicle is driving at a uniform speed during a preset time, calculating weights according to a plurality of conditions, respectively, and calculating a tire pressure based on the weights.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
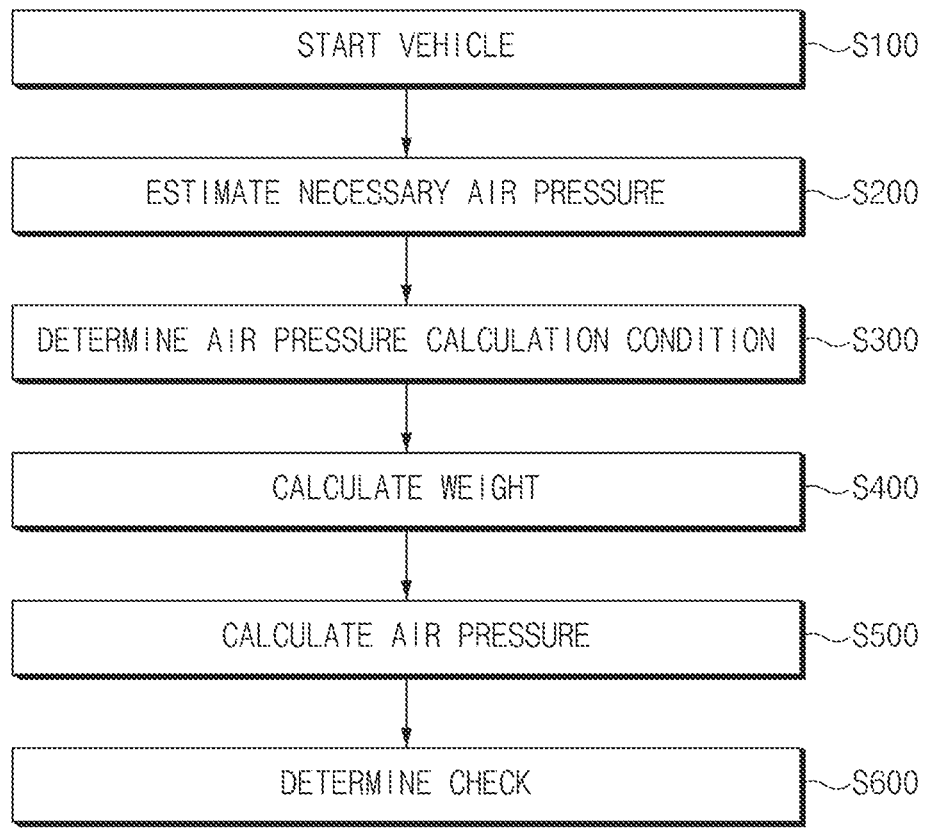
FIG. 1 is a flowchart schematically illustrating a tire pressure monitoring method according to an embodiment of the present disclosure.

Hereinafter, exemplary embodiments of the present disclosure will be described in detail with reference to the accompanying drawings. In adding reference numerals to components of each drawing, it should be noted that the same components have the same reference numerals, although they are indicated on another drawing. In describing the embodiments of the present disclosure, detailed descriptions associated with well-known functions or configurations will be omitted when they may make subject matters of the present disclosure unnecessarily obscure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 10.

FIG. 1 is a flowchart schematically illustrating a tire pressure monitoring method according to an embodiment of the present disclosure.

Referring to FIG. 1, a tire pressure monitoring method according to an embodiment of the present disclosure may include a vehicle starting step S100, a necessary air pressure estimating step S200, an air pressure calculation condition determining step S300, a weight calculating step S400, an air pressure calculating step S500, and a check determining step S600.

The vehicle starting step S100 may include a step of starting a vehicle such that a driver drives a vehicle. In this case, the vehicle may include an electric vehicle equipped with an in-wheel motor. Furthermore, the in-wheel motor may be installed on each wheel that delivers a driving force from the vehicle to the ground, and may be installed on at least one wheel at the front of the vehicle or at least one wheel at the rear of the vehicle.

The necessary air pressure estimating step S200 may include a step of estimating a necessary air pressure in a tire based on latitude according to the vehicle's current location and a temperature outside the vehicle.

For example, the necessary air pressure estimating step S200 may include a step of estimating a necessary air pressure in the vehicle's tire depending on a temperature from a preset tire necessary air pressure table when the vehicle's current location and temperature are not within a preset latitude range and preset external temperature range.

In the meantime, the necessary air pressure estimating step S200 may include a step of calculating a temperature correction coefficient depending on the vehicle's current temperature and estimating the necessary air pressure in the vehicle's tire depending on the temperature correction coefficient calculated from the preset tire necessary air pressure table, when the vehicle's current location and temperature are within the preset latitude range or the preset external temperature range. At this time, the preset latitude range may include a latitude range indicating equator regions of latitude between −10 degrees and +10 degrees or a polar region of latitude between 70 and 90 degrees. Besides, the preset temperature range may include below −5 degrees Celsius or above 30 degrees Celsius. The tire necessary air pressure table may include a result of testing the necessary air pressure of a tire according to an external temperature by a tire manufacturer.

In more detail, the necessary air pressure estimating step S200 may include a step of selecting and outputting a necessary air pressure depending on a temperature from the preset tire necessary air pressure table when the vehicle's current location is not near a polar region or near the equator.

The air pressure monitoring method according to an embodiment of the present disclosure may refer to a technology that estimates and calculates the air pressure of a tire based on an external temperature, a state of a road surface, a current applied to an in-wheel motor, a temperature of the in-wheel motor, and an output of the in-wheel motor, not directly detecting the air pressure of a tire; and, the air pressure monitoring method may perform the air pressure calculation condition determining step S300 of determining an air pressure calculation condition to increase the reliability of the estimated tire pressure.

The air pressure calculation condition determining step S300 may be a step of determining whether a condition for performing the air pressure monitoring method according to an embodiment of the present disclosure is satisfied.

For example, when it is determined in the air pressure calculation condition determining step S300 that a change in a current applied to the in-wheel motor is out of a preset range while a vehicle is driving at a uniform speed and torque during a preset time, it may be determined that a condition for performing the air pressure monitoring method according to an embodiment of the present disclosure is satisfied.

In more detail, in the air pressure calculation condition determining step S300, when the change rate of the current applied to the in-wheel motor is out of a preset range when a vehicle is driving while maintaining the number of revolutions and torque of an in-wheel motor within the preset range during the preset time, the air pressure monitoring method according to an embodiment of the present disclosure may be implemented.

The current applied to the in-wheel motor needs to be increased to provide the same in-wheel driving force as an in-wheel driving force at a point in time, when a tire pressure is not reduced, because a frictional force between a tire and a road surface is increased when the tire pressure decreases. Accordingly, whether the current applied to the in-wheel motor is increased in the preset environment and driving conditions may be a factor for determining whether the tire pressure is reduced.

Besides, the tire pressure monitoring method according to an embodiment of the present disclosure may calculate a tire pressure by calculating a weight for each of a temperature rise of the in-wheel motor, a state of a road surface, brake braking, and an output of the in-wheel motor. Accordingly, the tire pressure may be accurately calculated and monitored.

The weight calculating step S400 may include a step of determining a plurality of weight calculation conditions to calculate a weight for each condition.

For example, the weight calculating step S400 may include a step of calculating the weight for each of the temperature rise of the in-wheel motor, a rough road driving, a brake braking force, and an output of the in-wheel motor.

The air pressure calculating step S500 may include a step of summing the calculated weights and estimating a tire pressure reduction amount by the summed weight.

The air pressure calculating step S500 may include a step of estimating the tire pressure reduction amount according to the distance driven and driving time of the vehicle.

The air pressure calculating step S500 may include a step of calculating the tire pressure based on the tire pressure reduction amount by the summed weights and the tire pressure reduction amount by the driving distance and driving time.

The check determining step S600 may include a step of comparing the calculated tire pressure with the necessary air pressure estimated in the necessary air pressure estimating step S200 to determine whether the tire pressure is checked.

For example, the check determining step S600 may include a step of determining that the check is necessary when a difference between the necessary air pressure and the calculated tire pressure is out of a preset range.

Moreover, the check determining step S600 may include a step of determining that the check is necessary, when the difference in air pressure of each of tires mount in a vehicle is out of the preset range.

Figure 2:
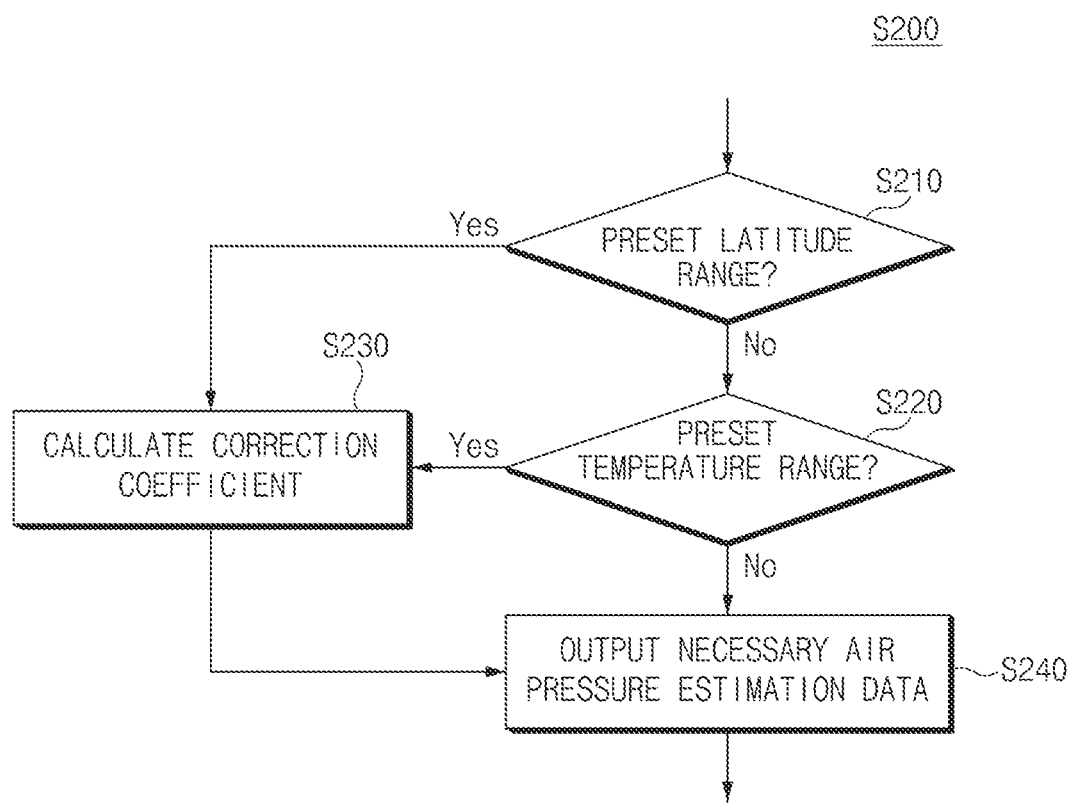
FIG. 2 is a flowchart illustrating a method of estimating a necessary air pressure in an tire pressure monitoring method according to an embodiment of the present disclosure.

FIG. 2 is a flowchart illustrating a method of estimating a necessary air pressure in a tire pressure monitoring method according to an embodiment of the present disclosure.

Referring to FIG. 2, the necessary air pressure estimating step S200 of FIG. 1 will be described as follows.

The necessary air pressure estimating step S200 may include a location determining step S210, an external temperature determining step S220, a correction coefficient calculating step S230, and a necessary air pressure estimation data outputting step S240.

The location determining step S210 may include a step of determining whether a vehicle's current location is within a preset latitude range.

For example, when it is determined in the location determining step S210 that the vehicle's current location is within the preset latitude range (Yes), the correction coefficient calculating step S230 may be performed. In addition, when it is determined in the location determining step S210 that the vehicle's current location is out of the preset latitude range (No), the external temperature determining step S220 may be performed.

In more detail, it is determined in the location determining step S210 that a vehicle is located in the equator of latitude between −10 degrees and +10 degrees or in polar regions of latitude between 70 degrees and 90 degrees (Yes), the correction coefficient calculating step S230 may be performed. Also, when it is determined in the location determining step S210 that the vehicle is located at latitude outside a latitude range including the equator or the polar regions (No), the external temperature determining step S220 may be performed.

The external temperature determining step S220 may include a step of determining whether the vehicle's external temperature is within a preset temperature range.

For example, when it is determined in the external temperature determining step S220 that the vehicle's current external temperature is within the preset temperature range (Yes), the correction coefficient calculating step S230 may be performed. Besides, when it is determined in the external temperature determining step S220 that the vehicle's current external temperature is out of the preset temperature range (No), the necessary air pressure estimation data outputting step S240 may be performed.

In more detail, when it is determined in the external temperature determining step S220 that the vehicle's external temperature is below minus 5 degrees or more than 30 degrees (Yes), the correction coefficient calculating step S230 may be performed. Furthermore, when it is determined in the external temperature determining step S220 that the vehicle's external temperature is between −5 degrees and 30 degrees (No), the necessary air pressure estimation data outputting step S240 may be performed.

When it is determined in the location determining step S210 that the vehicle's current location is within the preset latitude range, or when it is determined in the external temperature determining step S220 that the vehicle's current external temperature is within the preset temperature range, the correction coefficient calculating step S230 may be performed.

When the vehicle's current location is within the preset latitude range or the vehicle's current external temperature is within the preset temperature range, the correction coefficient calculating step S230 may include of a step of selecting a temperature correction coefficient depending on an external temperature. At this time, when the external temperature increases, the temperature correction coefficient may also increase. When the external temperature decreases, the temperature correction coefficient may also decrease.

When the temperature correction coefficient is selected in the correction coefficient calculating step S230, the necessary air pressure estimation data outputting step S240 may include a step of estimating an air pressure required for the vehicle's tire depending on a temperature, to which the selected temperature correction coefficient is applied, and outputting the estimated necessary air pressure as necessary air pressure estimation data.

In the meantime, when the vehicle's current location is not located within the preset latitude range, and the vehicle's external temperature is not included in the preset temperature range, the necessary air pressure estimation data outputting step S240 may include a step of estimating the air pressure required for the vehicle's tire depending on the vehicle's current external temperature.

In summary, when the vehicle's current location is out of the preset latitude range, and the vehicle's external temperature is not included in the preset temperature range, a necessary air pressure estimating method in the tire pressure monitoring method according to an embodiment of the present disclosure or the necessary air pressure estimating step S200 may include a step of estimating the air pressure required for the vehicle's tire depending on the vehicle's current external temperature.

In the meantime, when the vehicle's current location is included in the preset latitude range, and the vehicle's external temperature is included in the preset temperature range, a necessary air pressure estimating method in the tire pressure monitoring method according to an embodiment of the present disclosure or the necessary air pressure estimating step S200 may include a step of selecting a temperature correction coefficient depending on the vehicle's current external temperature, applying the selected temperature correction coefficient to the current external temperature, and estimating the air pressure required for the vehicle's tire depending on the current external temperature to which the temperature correction coefficient is applied.

Figure 3:
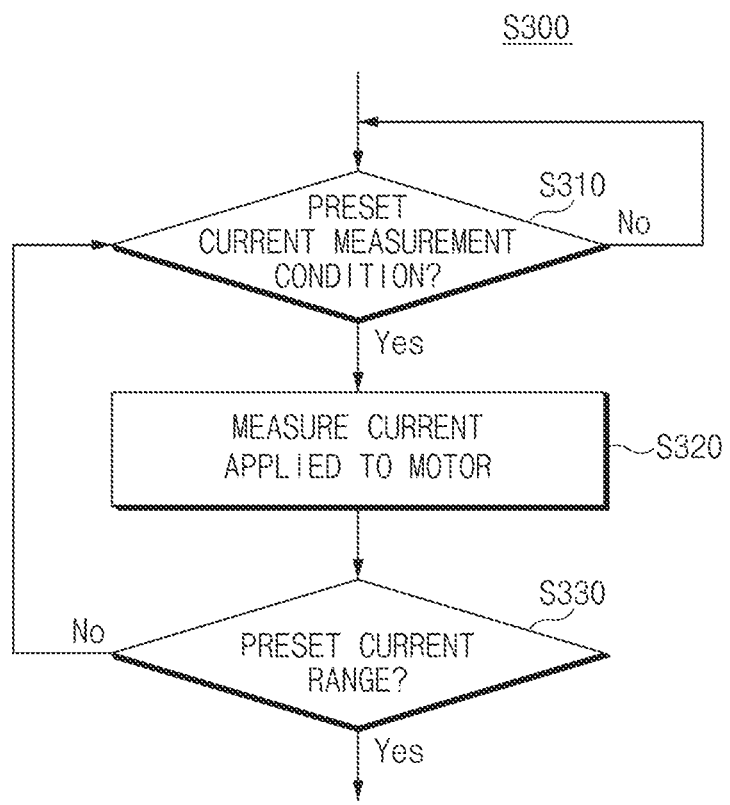
FIG. 3 is a flowchart illustrating a method of determining an air pressure calculation condition in a tire pressure monitoring method according to an embodiment of the present disclosure.

FIG. 3 is a flowchart illustrating a method of determining an air pressure calculation condition in a tire pressure monitoring method according to an embodiment of the present disclosure.

Referring to FIG. 3, the air pressure calculation condition determining step S300 of FIG. 1 will be described as follows.

The air pressure calculation condition determining step S300 may include a step of determining whether a change rate of a current applied to an in-wheel motor as compared to a reference exceeds a preset current change rate, when a vehicle is driving while maintaining the number of revolutions and torque of an in-wheel motor within a preset range during a preset time.

The air pressure calculation condition determining step S300 may include a current measurement condition determining step S310, a motor-applied-current measuring step S320, and a current change determining step S330.

The current measurement condition determining step S310 may include a step of determining whether a vehicle is driving while maintaining the number of revolutions and torque of an in-wheel motor within a preset range during a preset time.

For example, the current measurement condition determining step S310 may include a step of performing the motor-applied-current measuring step S320 when a vehicle is driving while maintaining the number of revolutions and torque of an in-wheel motor within a preset range during a preset time (Yes).

In the meantime, when it is determined in the current measurement condition determining step S310 that a vehicle fails to maintain the number of revolutions and torque of an in-wheel motor during a preset time or fails to maintain a uniform speed (No), the current measurement condition determining step S310 may be repeated until the vehicle is driving while maintaining the number of revolutions and torque of the in-wheel motor within the preset range during the preset time.

In more detail, when it is determined in the current measurement condition determining step S310 that a vehicle maintains a constant driving speed for 3 seconds, a change in the number of revolutions of the in-wheel motor is less than 5 rpm, and a torque change of the in-wheel motor is less than 10 Nm (Yes), the motor-applied-current measuring step S320 may be performed.

In the meantime, when it is determined in the current measurement condition determining step S310 that a vehicle fails to maintain a constant driving speed for 3 seconds, the change in the number of revolutions of the in-wheel motor is not less than 5 rpm, or the torque change of the in-wheel motor is not less than 10 Nm (No), the current measurement condition determining step S310 may be repeated.

When it is determined in the current measurement condition determining step S310 that a preset current measurement condition is satisfied (Yes), the motor-applied-current measuring step S320 may be performed.

The motor-applied-current measuring step S320 may include a step of measuring a current applied to the in-wheel motor.

The current change determining step S330 may include a step of determining whether a change in the current measured in the motor-applied-current measuring step S320 as compared to the reference current is within a preset current range. At this time, pieces of information about a value of the current applied to the in-wheel motor in a state (e.g., a tire having a normal air pressure) where a vehicle is normal depending on a vehicle speed and the number of revolutions and torque of the in-wheel motor may be provided by a vehicle manufacturer. Accordingly, when it is determined in the current change determining step S330 that the current applied to the in-wheel motor is changed as compared to a reference, it is also possible to compare an actually-measured current with a current corresponding to information provided by the vehicle manufacturer.

For example, when it is determined in the current change determining step S330 that the change in a current applied to the in-wheel motor as compared to a reference is within the preset current range (No), the current measurement condition determining step S310 may be performed.

In the meantime, when it is determined in the current change determining step S330 that the change in the current applied to the in-wheel motor as compared to an existing value is out of the preset current range (Yes), the weight calculating step S400 may be performed.

In more detail, when it is determined in the current change determining step S330 that a difference between the current applied to the in-wheel motor and a current corresponding to information provided by the vehicle manufacturer is within the preset current range (e.g., 2%) (No), the current measurement condition determining step S310 may be performed again.

In the meantime, when it is determined in the current change determining step S330 that the difference in information between the current applied to the in-wheel motor and the current corresponding to information provided by the vehicle manufacturer is out of the preset current range (e.g., 2%) (Yes), the weight calculating step S400 may be performed.

That is, when it is determined in the current change determining step S330 that the current applied to the in-wheel motor is within the preset current range (e.g., current information provided by the vehicle manufacturer) (No), it is determined that there is no need to estimate a tire pressure of the vehicle, and thus the current measurement condition determining step S310 may be performed again.

Moreover, when it is determined in the current change determining step S330 that the current applied to the in-wheel motor is out of the preset current range (e.g., current information provided by the vehicle manufacturer) (Yes), it is determined that there is a need to estimate the tire pressure of the vehicle, and thus the weight calculating step S400 may be performed.

Figure 4:
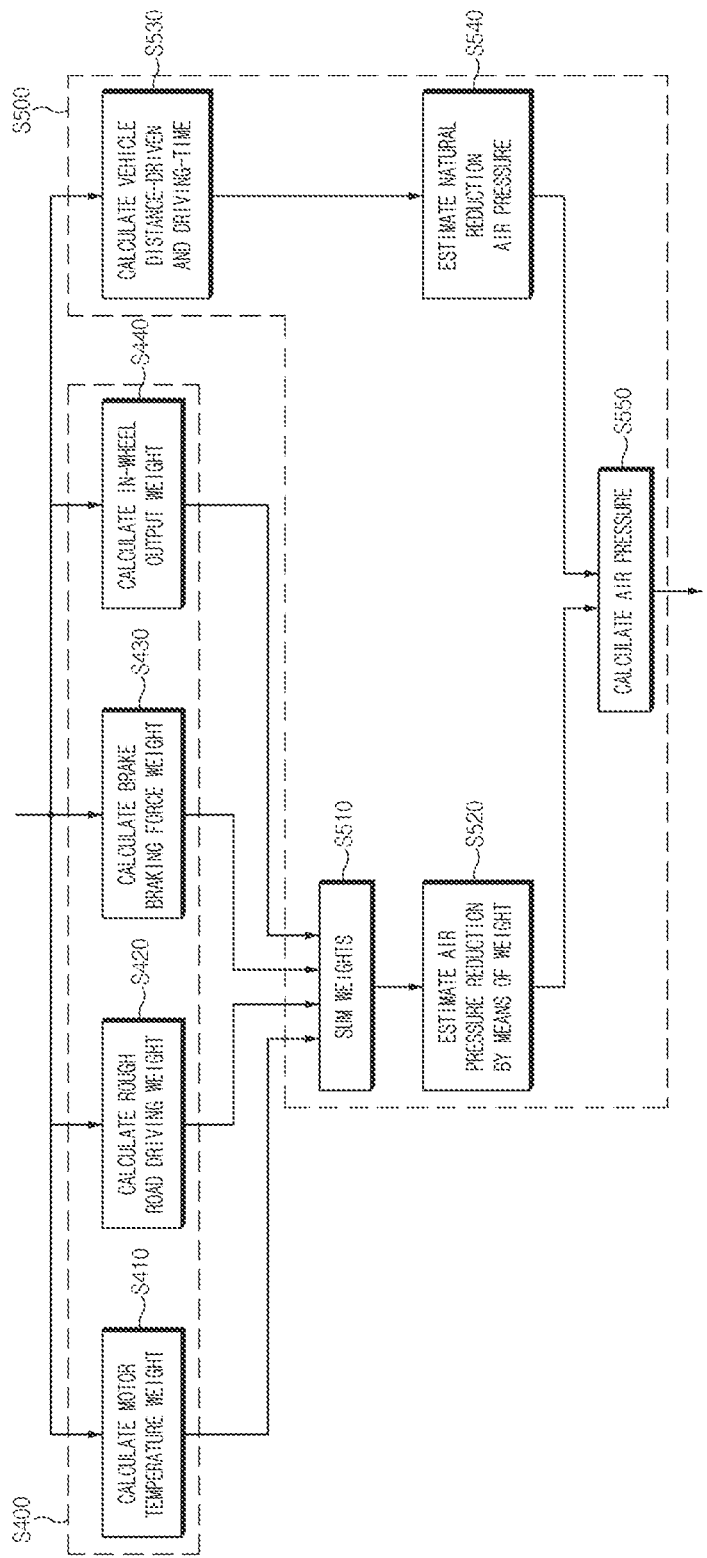
FIG. 4 is a flowchart illustrating a weight calculating method and an air pressure calculating method in a tire pressure monitoring method according to an embodiment of the present disclosure.

FIG. 4 is a flowchart illustrating a weight calculating method and an air pressure calculating method in a tire pressure monitoring method according to an embodiment of the present disclosure.

Referring to FIG. 4, a weight calculating method and an air pressure calculating method in the tire pressure monitoring method according to an embodiment of the present disclosure will be described as follows.

First of all, the weight calculating method will be described with reference to the weight calculating step S400 shown in FIG. 4. At this time, it is disclosed that a weight for a factor for determining the reduction of tire pressure and a weight for each of conditions for determining the reduction factor of a tire pressure (i.e., the temperature rise (the determination of tire pressure reduction) of an in-wheel motor, rough road driving (a factor for reducing tire pressure), brake braking force (a factor for reducing tire pressure), an output of the in-wheel motor (a factor for reducing tire pressure)) are calculated in the weight calculating step S400, but are not limited thereto.

The weight calculating step S400 may refer to a step of determining a plurality of weight calculation conditions to calculate a weight for each condition; and, the weight calculating step S400 may include a step of calculating the weight for each of the temperature rise of the in-wheel motor, a rough road driving, a brake braking force, and an output of the in-wheel motor.

The weight calculating step S400 may include a motor temperature weight calculating step S410, a rough road driving weight calculating step S420, a brake braking force weight calculating step S430, and an in-wheel output weight calculating step S440.

The motor temperature weight calculating step S410 may include a step of comparing a vehicle's current external temperature with a temperature of the in-wheel motor and calculating a weight for an increase in the operating temperature of the in-wheel motor.

The rough road driving weight calculating step S420 may include a step of detecting the state of a road surface, on which the vehicle is driving, to determine whether the vehicle is driving on a rough road, and calculating a weight of a ripple of the current applied to an in-wheel motor when it is determined that the vehicle is driving on a rough road.

The brake braking force weight calculating step S430 may include a step of calculating a weight for the braking force when the vehicle being driven is braked.

The in-wheel output weight calculating step S440 may include a step of calculating weights for the output of the in-wheel motor and a turning force of the vehicle.

When the weight calculating step S400 is completed, the air pressure calculating step S500 may be performed.

The air pressure calculating step S500 may include a step of estimating a tire pressure reduction for the sum of weights for each condition calculated in the weight calculating step S400, and calculating the distance driven and driving time of the vehicle to estimate the tire pressure reduction due to natural reduction.

The air pressure calculating step S500 may include a step calculating the air pressure of a tire based on the tire pressure reduction estimating result by means of a weight and the tire pressure reduction estimating result by the distance driven and driving time.

The air pressure calculating step S500 may include a weight summing step S510, a step S520 of estimating air pressure reduction by means of a weight (hereinafter, referred to as "weight air pressure reduction estimating step"), a vehicle distance-driven and driving-time calculating step S530, a natural reduction air pressure estimating step S540, and an air pressure calculating step S550.

The weight summing step S510 may include a step of summing weights respectively calculated by the motor temperature weight calculating step S410, the rough road driving weight calculating step S420, the brake braking force weight calculating step S430, and the in-wheel output weight calculating step S440.

The weight air pressure reduction estimating step S520 may include a step of estimating the tire pressure reduction based on the weight summed in the weight summing step S510.

For example, the weight air pressure reduction estimating step S520 may include a step of increasing the estimated tire pressure reduction amount when the weight summed in the weight summing step S510 is increased.

The vehicle distance-driven and driving-time calculating step S530 may include a step of calculating the distance driven and driving time of a vehicle.

The natural reduction air pressure estimating step S540 may include a step of estimating the tire pressure reduction amount, based on the vehicle's distance driven and driving time that are calculated in the vehicle distance-driven and driving-time calculating step S530.

For example, the natural reduction air pressure estimating step S540 may include a step of increasing the estimated tire pressure reduction amount when the distance driven and driving time of the vehicle are increased.

The air pressure calculating step S550 may include a step of calculating a tire pressure based on the tire pressure reduction amount estimated in the weight air pressure reduction estimating step S520 and the tire pressure reduction amount estimated in the natural reduction air pressure estimating step S540.

For example, the air pressure calculating step S550 may include a step of calculating the tire pressure by subtracting the air pressure reduction amount estimated in the weight air pressure reduction estimating step S520 and the natural reduction air pressure estimating step S540 from the necessary air pressure estimated in the necessary air pressure estimating step S200.

Figure 5:
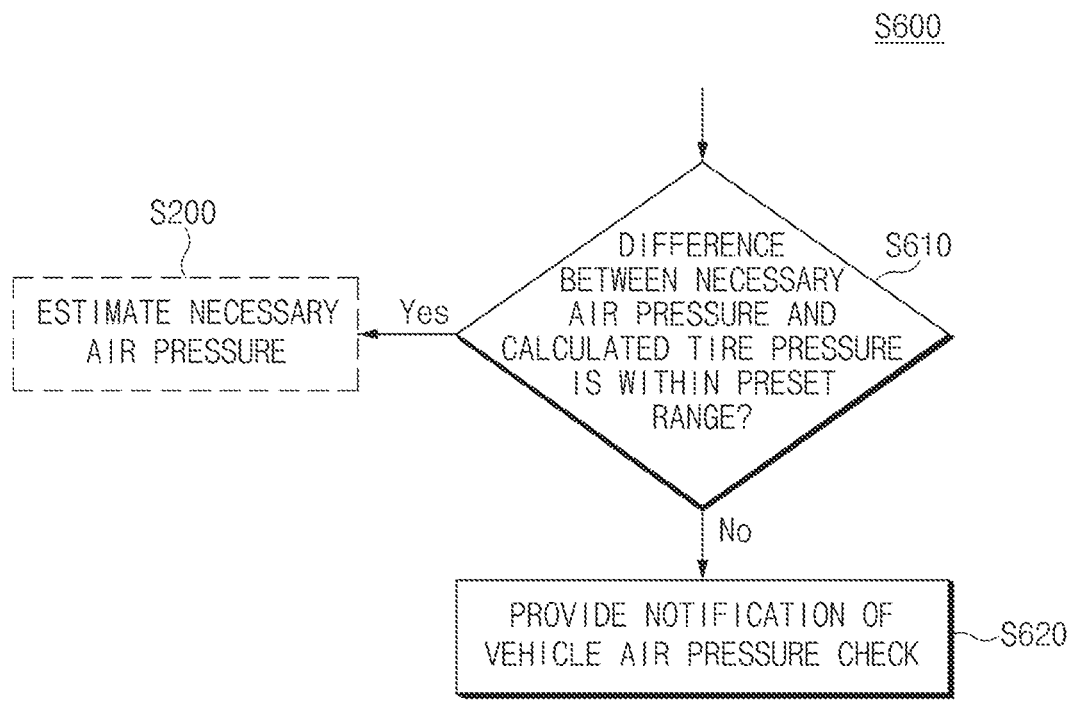
FIGS. 5 and 6 are flowcharts illustrating a check determining method in a tire pressure monitoring method according to an embodiment of the present disclosure.
Figure 6:
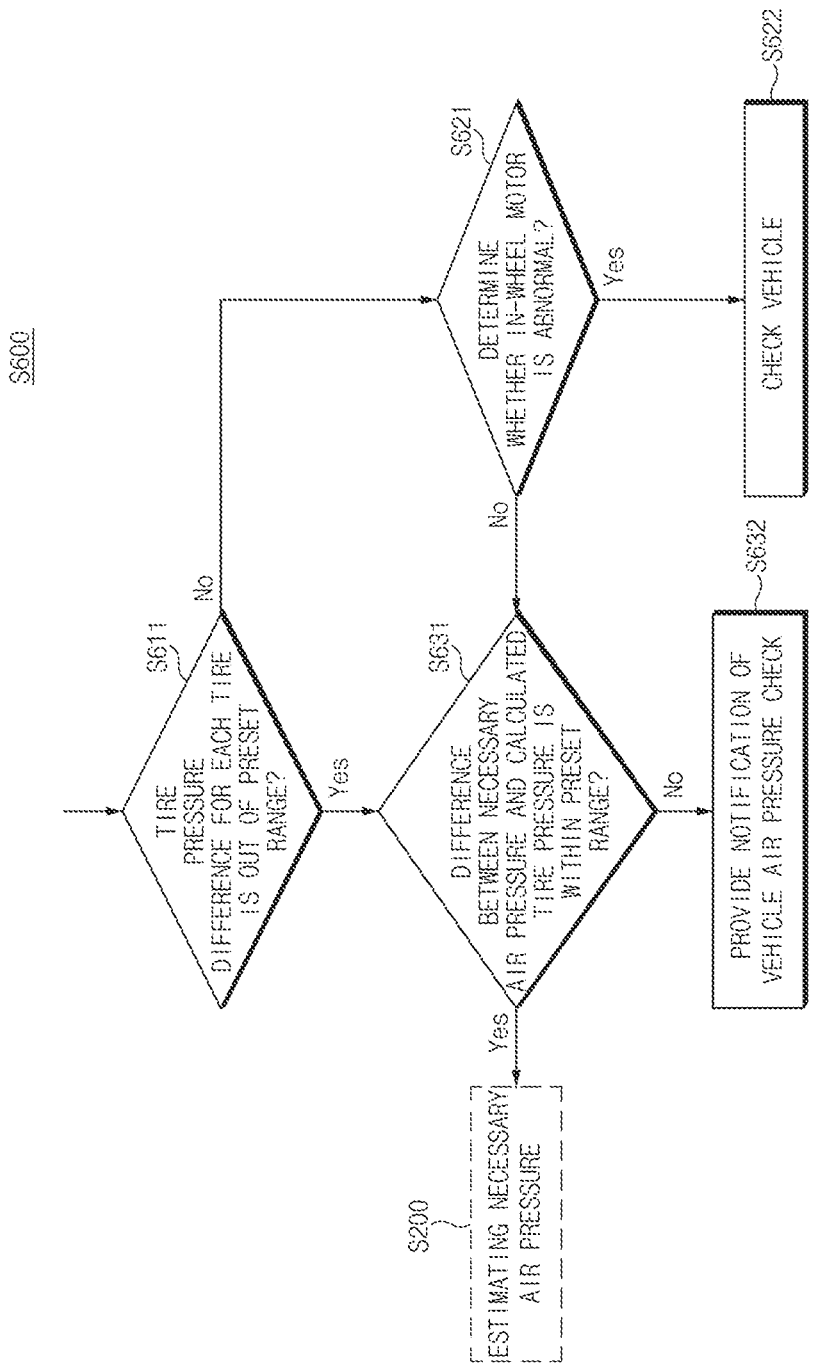

FIGS. 5 and 6 are flowcharts illustrating a check determining method in a tire pressure monitoring method according to an embodiment of the present disclosure.

Referring to FIGS. 5 and 6, the check determination method in the tire pressure monitoring method according to an embodiment of the present disclosure will be described with reference to the check determining step S600 of FIG. 1 as follows.

Referring to FIG. 5, the check determining step S600 may include a step of comparing the tire necessary air pressure estimated in the necessary air pressure estimating step S200 with the tire pressure calculated in the air pressure calculating step S500 and notifying a driver or passenger that a tire pressure check is necessary.

The check determining step S600 may include an air pressure comparing step S610 and a vehicle air pressure check notifying step S620.

The air pressure comparing step S610 may include a step of comparing the necessary air pressure estimated in the necessary air pressure estimating step S200 with the tire pressure calculated in the air pressure calculating step S500.

For example, when it is determined in the air pressure comparing step S610 that a difference between the necessary air pressure estimated in the necessary air pressure estimating step S200 and the tire pressure calculated in the air pressure calculating step S500 is out of a preset range (No), the vehicle air pressure check notifying step S620 may be performed.

In the meantime, when it is determined in the air pressure comparing step S610 that the difference between the necessary air pressure estimated in the necessary air pressure estimating step S200 and the tire pressure calculated in the air pressure calculating step S500 is within the preset range (Yes), the necessary air pressure estimating step S200 may be performed.

In more detail, when it is determined in the air pressure comparing step S610 that the difference between the necessary air pressure estimated in the necessary air pressure estimating step S200 and the tire pressure calculated in the air pressure calculating step S500 exceeds 5% as compared to the necessary air pressure (No), the vehicle air pressure check notifying step S620 may be performed.

In the meantime, when it is determined in the air pressure comparing step S610 that the difference between the necessary air pressure estimated in the necessary air pressure estimating step S200 and the tire pressure calculated in the air pressure calculating step S500 is within 5% as compared to the necessary air pressure (Yes), the necessary air pressure estimating step S200 may be performed.

The vehicle air pressure check notifying step S620 refers to a step performed when the tire pressure of a vehicle is lowered by more than 5% as compared to the necessary air pressure in the air pressure comparing step S610; and, the vehicle air pressure check notifying step S620 may include a step of notifying a driver or passenger of a tire check.

FIG. 6 illustrates the check determining step S600 according to another embodiment of a check determining method in the tire pressure monitoring method according to an embodiment of the present disclosure.

Referring to FIG. 6, the check determining step S600 may include a first air pressure comparing step S611, an in-wheel motor abnormality determining step S621, a vehicle check notifying step S622, a second air pressure comparing step S631, and a vehicle air pressure check notifying step S632.

The first air pressure comparing step S611 may include a step of comparing a difference in air pressure for each tire provided in a vehicle.

For example, when it is determined in the first air pressure comparing step S611 that a tire pressure difference calculated for each tire in the air pressure calculating step S500 is out of a preset range (No), the in-wheel motor abnormality determining step S621 may be performed.

In the meantime, when it is determined in the first air pressure comparing step S611 that an air pressure difference for each tire is not out of the preset range (Yes), the second air pressure comparing step S631 may be performed.

In more detail, when it is determined in the first air pressure comparing step S611 that a difference between a left (or front) tire pressure and a right (or rear) of the tire pressure calculated in the air pressure calculating step S500 is out of the preset range (e.g., 5%) (No), the in-wheel motor abnormality determining step S621 may be performed.

In the meantime, when it is determined in the first air pressure comparing step S611 that a difference between a left (or front) tire pressure and a right (or rear) of tire pressure calculated in the air pressure calculating step S500 is not out of a preset range (e.g., 5%) (Yes), the second air pressure comparing step S631 may be performed.

The in-wheel motor abnormality determining step S621 may include a step of checking whether there is a hardware problem of an in-wheel motor. At this time, the in-wheel motor abnormality determining step S621 may include a step of determining, by a driver of a vehicle or a user, whether the in-wheel motor is abnormal, through the sense of sight, smell, hearing, and tactile, or with a simple device.

For example, when it is determined in the in-wheel motor abnormality determining step S621 that the hardware problem of the in-wheel motor is found (Yes), the vehicle check notifying step S622 may be performed.

In the meantime, when it is determined in the in-wheel motor abnormality determining step S621 that the hardware problem of the in-wheel motor is not found (No), the second air pressure comparing step S631 may be performed.

The vehicle check notifying step 622 may include a step of notifying a driver or passenger that a vehicle needs to be checked, by means of using visual or audible information.

The second air pressure comparing step S631 may include a step of comparing the necessary air pressure estimated in the necessary air pressure estimating step S200 with the tire pressure calculated in the air pressure calculating step S500.

For example, when it is determined in the second air pressure comparing step S631 that a difference between the necessary air pressure estimated in the necessary air pressure estimating step S200 and the tire pressure calculated in the air pressure calculating step S500 is out of a preset range (No), the vehicle air pressure check notifying step S632 may be performed.

In the meantime, when it is determined in the second air pressure comparing step S631 that the difference between the necessary air pressure estimated in the necessary air pressure estimating step S200 and the tire pressure calculated in the air pressure calculating step S500 is within the preset range (Yes), the necessary air pressure estimating step S200 may be performed.

In more detail, when it is determined in the second air pressure comparing step S631 that the difference between the necessary air pressure estimated in the necessary air pressure estimating step S200 and the tire pressure calculated in the air pressure calculating step S500 exceeds 5% as compared to the necessary air pressure (No), the vehicle air pressure check notifying step S632 may be performed.

In the meantime, when it is determined in the second air pressure comparing step S631 that the difference between the necessary air pressure estimated in the necessary air pressure estimating step S200 and the tire pressure calculated in the air pressure calculating step S500 is within 5% as compared to the necessary air pressure (Yes), the necessary air pressure estimating step S200 may be performed.

The vehicle air pressure check notifying step S632 refers to a step performed when the tire pressure of a vehicle is lowered by more than 5% as compared to the necessary air pressure in the second air pressure comparing step S631; and, the vehicle air pressure check notifying step S620 may include a step of notifying a driver or passenger of a tire check.

FIGS. 7 to 10 illustrate embodiments of the motor temperature weight calculating step S410, the rough road driving weight calculating step S420, the brake braking force weight calculating step S430, and the in-wheel output weight calculating step S440 illustrated in FIG. 4.

Figure 7:
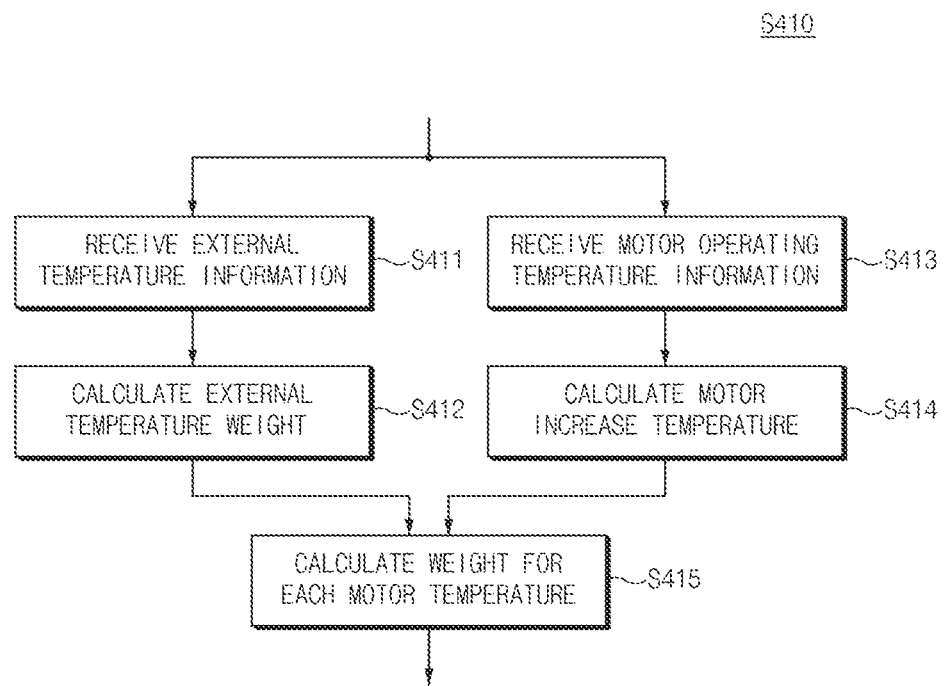
FIG. 7 is a flowchart illustrating a motor temperature weight calculating method among weight calculating methods of a tire pressure monitoring method according to an embodiment of the present disclosure.

FIG. 7 is a flowchart illustrating a motor temperature weight calculating method among weight calculating methods of a tire pressure monitoring method according to an embodiment of the present disclosure.

Referring to FIG. 7, a motor temperature weight calculating step S410 of FIG. 4 will be described as follows.

The motor temperature weight calculating step S410 may include an external temperature information receiving step S411, an external temperature weight calculating step S412, a motor operating temperature information receiving step S413, a motor increase temperature calculating step S414, and a motor temperature weight calculating step S415.

The external temperature information receiving step S411 may include a step of receiving information about an external temperature of a vehicle through a temperature sensor installed in the vehicle or a vehicle network.

The external temperature weight calculating step S412 may include a step of calculating a weight for the information about the external temperature received in the external temperature information receiving step S411.

For example, the external temperature weight calculating step S412 may include a step of calculating a weight for the external temperature in a preset weight calculation method.

In more detail, the external temperature weight calculating step S412 may include a step of calculating an external temperature weight by using a formula of $Ax^a$. In this case, 'x' may denote an external temperature; each of 'A' and 'a' may denote a value capable of being changed in response to the external temperature. The values of 'A' and 'a' corresponding to the external temperature may be provided in a form of a table.

That is, assuming that the current external temperature is 10 degrees, 'A' for the external temperature of 10 degrees is 0.2, and 'a' is 1.1, an external temperature weight calculated in the external temperature weight calculating step S412 may be "0.2*10^(1.1)=2.5178".

The motor operating temperature information receiving step S413 may include a step of receiving current temperature information of an in-wheel motor.

For example, the motor operating temperature information receiving step S413 may include a step of receiving temperature information of an in-wheel motor from a sensor that detects the temperature of the in-wheel motor.

The motor increase temperature calculating step S414 may include a step of calculating the temperature increase of the in-wheel motor based on the temperature information of the in-wheel motor received in the motor operating temperature information receiving step S413 and the external temperature information received in the external temperature information receiving step S411.

For example, the motor increase temperature calculating step S414 may include a step of calculating a difference between the temperature of the in-wheel motor and the external temperature, and calculating a weight of the calculated value.

In more detail, the motor increase temperature calculating step S414 may include a step of calculating a weight of the difference between the temperature of the in-wheel motor of the in-wheel motor and the external temperature by using the preset formula ($Ax^a$). At this time, 'x' may denote a difference between a temperature of an in-wheel motor and an external temperature; each of 'A' and 'a' may denote a value capable of being changed in response to the difference between the temperature of the in-wheel motor and the external temperature. The values of 'A' and 'a' respectively corresponding to the temperature of the in-wheel motor and the external temperature may be provided in a form of a table.

The motor temperature weight calculating step S415 may include a step of calculating and outputting a motor temperature weight based on weights respectively calculated in the external temperature weight calculating step S412 and the motor increase temperature calculating step S414.

For example, the motor temperature weight calculating step S415 may include a step of multiplying an operating time of the in-wheel motor by the weight calculated in the motor increase temperature calculating step S414, and adding the weight calculated in the external temperature weight calculating step S412 and a result of the multiplication operation to calculate a motor temperature weight.

Figure 8:
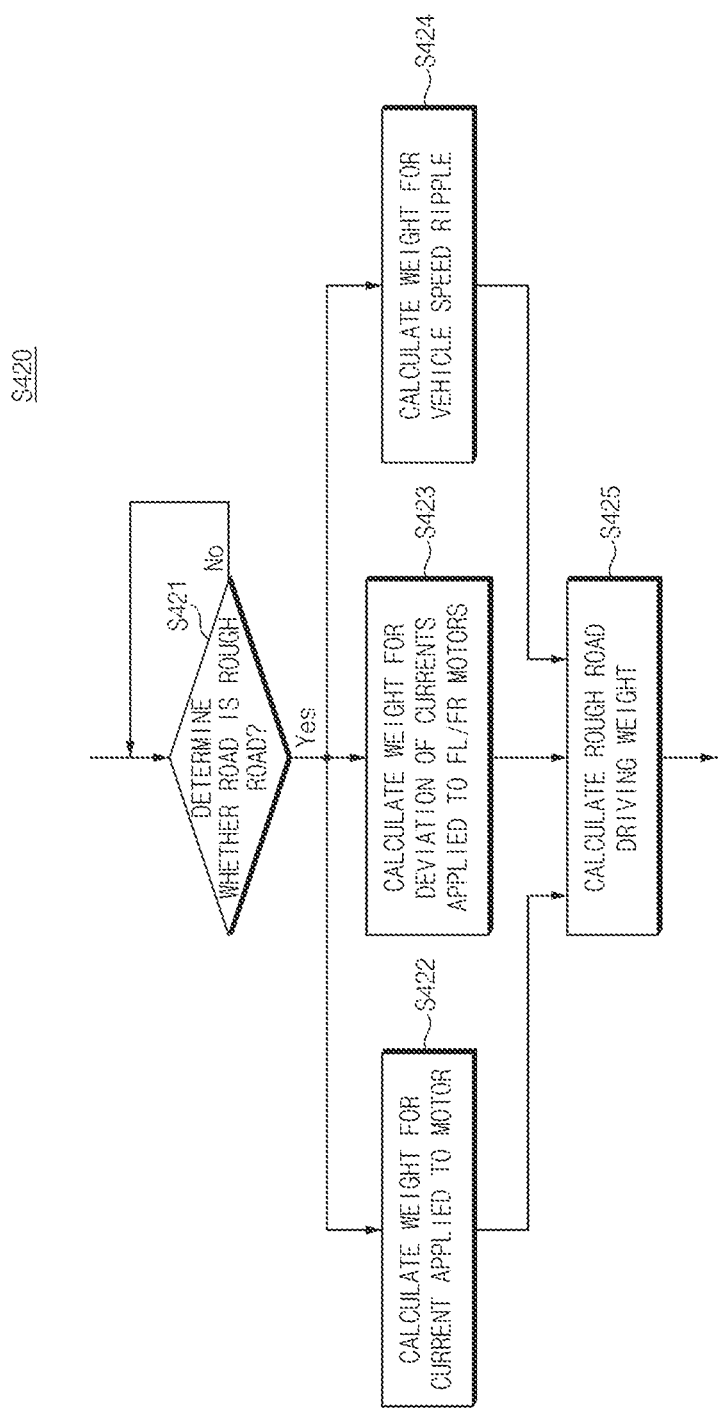
FIG. 8 is a flowchart illustrating a rough road driving weight calculating method among weight calculating methods of a tire pressure monitoring method according to an embodiment of the present disclosure.

FIG. 8 is a flowchart illustrating a rough road driving weight calculating method among weight calculating methods of a tire pressure monitoring method according to an embodiment of the present disclosure.

Referring to FIG. 8, the rough road driving weight calculating step S420 of FIG. 4 will be described as follows.

The rough road driving weight calculating step S420 may include a rough road determining step S421, a first rough road weight calculating step S422, a second rough road weight calculating step S423, a third rough road weight calculating step S424, and a rough road driving weight calculating step S425.

The rough road determining step S421 may include a step of determining whether a road, on which a vehicle is currently driving, is a rough road.

For example, when it is determined in the rough road determining step S421 that a vehicle speed ripple or a current ripple applied to an in-wheel motor is out of a preset range (Yes), it may be determined that the road on which the vehicle is driving is a rough road, and thus the first to third rough road weight calculating steps S422, S423, and S424 may be performed.

For example, when it is determined in the rough road determining step S421 that the vehicle speed ripple or the current ripple applied to the in-wheel motor is not out of the preset range (No), it may be determined that the road on which the vehicle is driving is not a rough road, and thus the rough road determining step S421 may be performed again.

In more detail, when it is determined in the rough road determining step S421 that the vehicle speed ripple or the current ripple applied to the in-wheel motor exceeds 5% (Yes), the first to third rough road weight calculating steps S422, S423, and S424 may be performed.

In the meantime, when it is determined in the rough road determining step S421 that the vehicle speed ripple or the current ripple applied to the in-wheel motor does not exceed 5% (No), the rough road determining step S421 may be performed again.

The first rough road weight calculating step S422 may include a step of calculating a weight for a current applied to the in-wheel motor.

For example, the first rough road weight calculating step S422 may include a step of calculating a weight for a current applied to the in-wheel motor based on a preset formula (e.g., $Ax^a$). At this time, 'x' may denote a current applied to an in-wheel motor; each of 'A' and 'a' may denote a value capable of being changed in response to the current applied to the in-wheel motor. The values of 'A' and 'a' respectively corresponding to currents applied to the in-wheel motor may be provided in a form of a table.

The second rough road weight calculating step S423 may include a step of calculating a weight for a deviation of currents applied to in-wheel motors included in the vehicle.

For example, the second rough road weight calculating step S423 may include a step of calculating a weight for the deviation of the current applied to a front left (FL) in-wheel motor and the current applied to a front right (FR) in-wheel motor.

In more detail, the second rough road weight calculating step S423 may include a step of calculating the weight for the deviation of currents applied to front left and front right in-wheel motors based on the preset formula (e.g., $Ax^a$). At this time, 'x' may denote a deviation of currents applied to front left and front right in-wheel motors; each of 'A' and 'a' may denote a value capable of being changed in response to the deviation of currents applied to the front left and front right in-wheel motors. The values of 'A' and 'a' respectively corresponding to deviations of currents applied to the front left and front right in-wheel motors may be provided in a form of a table.

The third rough road weight calculating step S424 may include a step of calculating a weight for a vehicle speed ripple.

For example, the third rough road weight calculating step S424 may include a step of calculating the weight of the vehicle speed ripple based on a preset formula (e.g., $Ax^a$). At this time, 'x' may denote a ripple value of a vehicle speed; each of 'A' and 'a' may denote a value capable of being changed in response to a ripple of the vehicle speed. The values of 'A' and 'a' respectively corresponding to ripples of a vehicle speed may be provided in a form of a table.

The rough road driving weight calculating step S425 may include a step of calculating a rough road driving weight based on weights calculated in the first to third rough road weight calculating steps S422, S423, and S424.

For example, the rough road driving weight calculating step S425 may include a step of adding the weights calculated in the first to third rough road weight calculating steps S422, S423, and S424 and calculating the rough road driving weight.

Figure 9:
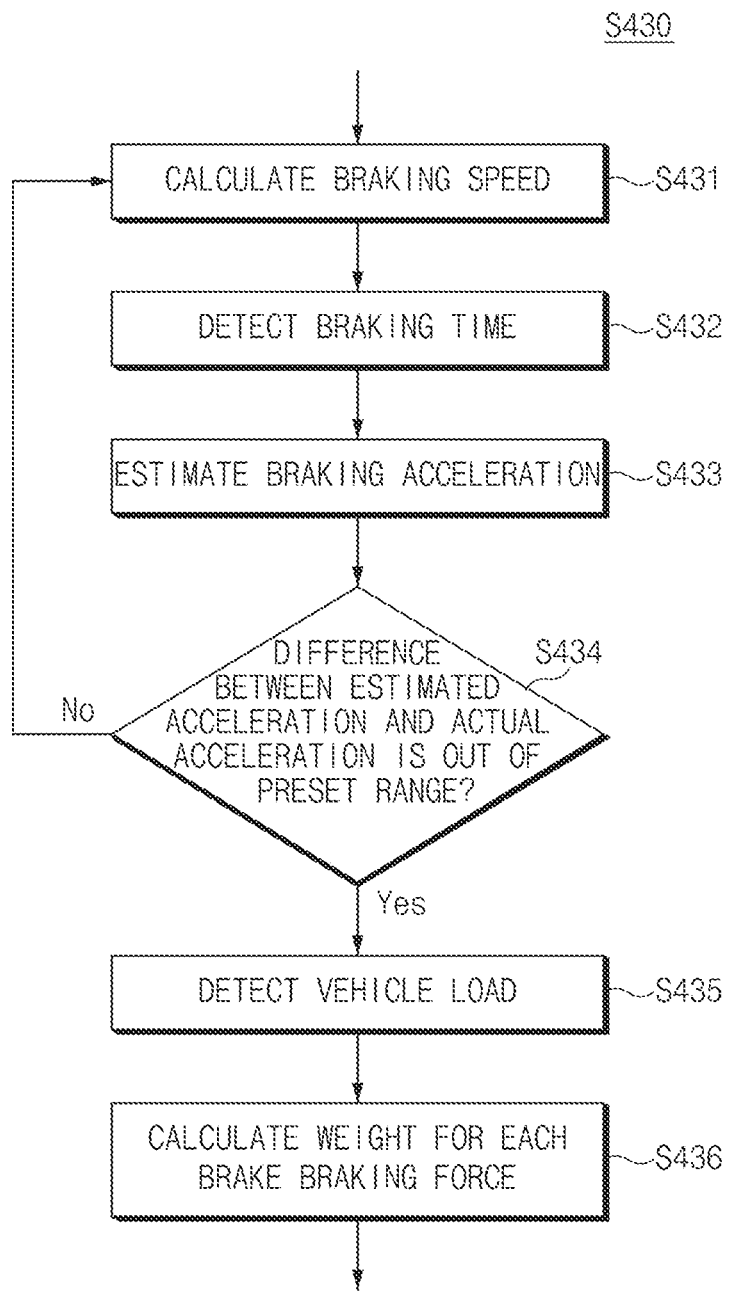
FIG. 9 is a flowchart illustrating a brake braking force weight calculating method among weight calculating methods of a tire pressure monitoring method according to an embodiment of the present disclosure.

FIG. 9 is a flowchart illustrating a brake braking force weight calculating method among weight calculating methods of a tire pressure monitoring method according to an embodiment of the present disclosure.

Referring to FIG. 9, the brake braking force weight calculating step S430 of FIG. 4 will be described as follows.

The brake braking force weight calculating step S430 may include a braking speed calculating step S431, a braking time detecting step S432, a braking acceleration estimating step S433, a braking acceleration verifying step S434, a vehicle load detecting step S435, and a brake braking force weight calculating step S436.

The braking speed calculating step S431 may include a step of calculating a braking speed based on a speed before braking and a speed after braking.

For example, the braking speed calculating step S431 may include a step of calculating the braking speed (=speed before braking−speed after braking) based on a difference between the speed before braking and the speed after braking and calculating a weight depending on the calculated braking speed.

In more detail, the braking speed calculating step S431 may include a step of calculating the braking speed by subtracting the speed after braking from the speed before braking and calculating a weight for the braking speed depending on a preset formula ($Ax^a$) based on the calculated braking speed. At this time, 'x' may denote a braking speed;

each of 'A' and 'a' may denote a value capable of being changed in response to the braking speed. The values of 'A' and 'a' respectively corresponding to braking speeds are implemented as a table, and may be values selected depending on the braking speed.

The braking time detecting step S432 may include a step of detecting the braking time of a vehicle.

For example, the braking time detecting step S432 may include a step of detecting an operating time of a brake, and may include a step of calculating a weight for the detected braking time.

In more detail, the braking time detecting step S432 may include a step of calculating a weight for the braking time depending on a preset formula ($Ax^a$) based on the detected braking time. At this time, 'x' may denote a braking time; each of 'A' and 'a' may denote a value capable of being changed in response to the braking time. The values of 'A' and 'a' respectively corresponding to braking times are implemented as a table, and may be values selected depending on the braking time.

The braking acceleration estimating step S433 may include a step of estimating a braking acceleration based on the braking speed of the braking speed calculating step S431 and the braking time of the braking time detecting step S432.

For example, the braking acceleration estimating step S433 may include a step of estimating the braking acceleration by dividing the braking speed by the braking time.

The braking acceleration verifying step S434 may include a step of verifying the estimated braking acceleration based on the braking acceleration estimated in the braking acceleration estimating step S433 and the actual acceleration of the vehicle.

For example, when it is determined in the braking acceleration verifying step S434 that a difference between the braking acceleration estimated in the braking acceleration estimating step S433 and the actual acceleration of the vehicle is out of a preset range (e.g. 5% of the actual acceleration) (Yes), the vehicle load detecting step S435 may be performed.

in the meantime, when it is determined in the braking acceleration verifying step S434 that the difference between the braking acceleration estimated in the braking acceleration estimating step S433 and the actual acceleration of the vehicle is not out of a preset range (e.g. 5% of the actual acceleration) (No), it is determined that there is no reliability in the estimated braking acceleration, and thus the braking speed calculating step S431 may be performed again.

The vehicle load detecting step S435 may include a step of detecting a load of the vehicle.

The brake braking force weight calculating step S436 may include a step of calculating a brake braking force weight based on a weight for the braking speed calculated in the braking speed calculating step S431, a weight for the braking time detected in the braking time detecting step S432, and a vehicle load detected in the vehicle load detecting step S435.

For example, as the braking acceleration of a vehicle increases, the reduction amount of a tire pressure may increase. As the vehicle load is heavy, the reduction amount of a tire pressure during braking may increase. Accordingly, the brake braking force weight calculating step S436 may include a step of multiplying the load of the vehicle by a value (a weight for a braking acceleration) obtained by dividing a weight for the braking speed by a weight for the braking time, and calculating the brake braking force weight.

Figure 10:
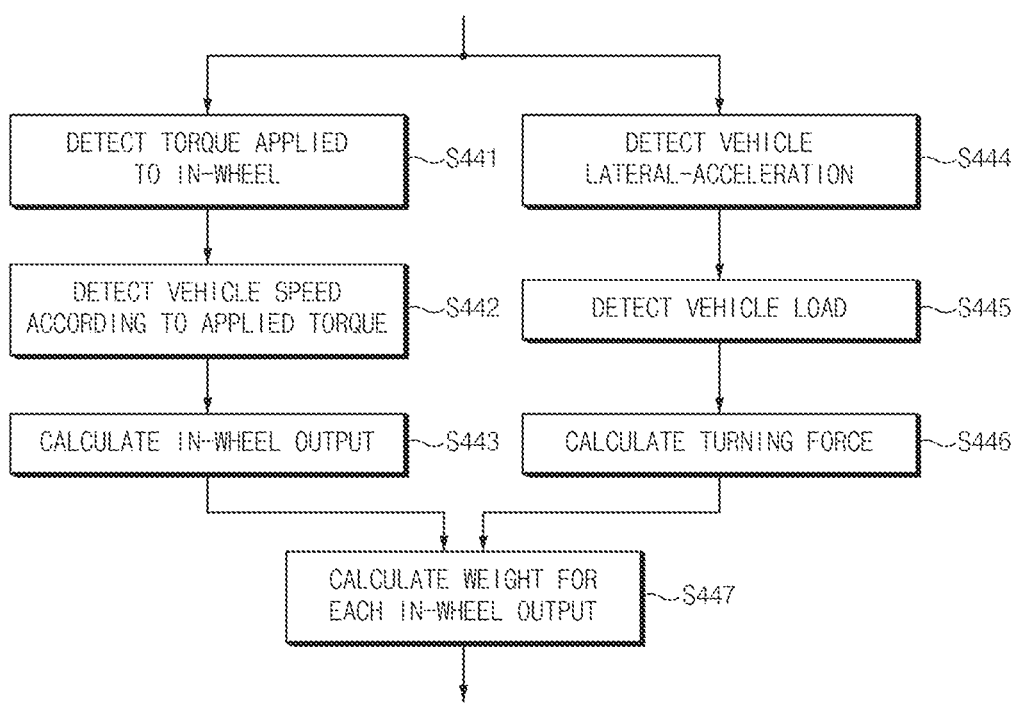
FIG. 10 is a flowchart illustrating an in-wheel output weight calculating method among weight calculating methods of a tire pressure monitoring method according to an embodiment of the present disclosure.

FIG. 10 is a flowchart illustrating an in-wheel output weight calculating method among weight calculating methods of a tire pressure monitoring method according to an embodiment of the present disclosure.

Referring to FIG. 10, the in-wheel output weight calculating step S440 will be described as follows.

Referring to FIG. 10, the in-wheel output weight calculating step S440 may include an in-wheel-applied-torque detecting step S441, a vehicle speed detecting step S442, an in-wheel output calculating step S443, a vehicle lateral-acceleration detecting step S444, a vehicle load detecting step S445, a turning force calculating step S446, and an in-wheel output weight calculating step S447.

The in-wheel-applied-torque detecting step S441 may include a step of detecting a torque of an in-wheel motor driving a tire.

The in-wheel-applied-torque detecting step S441 may include a step of calculating a weight for the detected torque of the in-wheel motor.

For example, the in-wheel-applied-torque detecting step S441 may calculate a weight for a torque of the in-wheel motor depending on a preset formula ($Ax^a$) based on the torque of the in-wheel motor. At this time, 'x' may denote a torque of an in-wheel motor; and, each of 'A' and 'a' may denote a value capable of being changed in response to the torque of the in-wheel motor. The values of 'A' and 'a' respectively corresponding to torques of in-wheel motors are implemented as a table, and may be values selected from the table depending on a torque value of the in-wheel motor.

The vehicle speed detecting step S442 may include a step of detecting a speed of a vehicle.

The in-wheel output calculating step S443 may include a step of calculating an output of the in-wheel motor based on a torque of the in-wheel motor detected in the in-wheel-applied-torque detecting step S441 and a vehicle speed detected in the vehicle speed detecting step S442.

For example, the output of the in-wheel motor may be generated by multiplying the torque of the in-wheel motor and the vehicle speed, and thus the in-wheel output calculating step S443 may include a step of calculating an output of the in-wheel motor by multiplying the torque detected in the in-wheel-applied-torque detecting step S441 by the vehicle speed detected in the vehicle speed detecting step S442.

The in-wheel output calculating step S443 may include a step of calculating a weight for the calculated output of the in-wheel motor.

For example, the in-wheel output calculating step S443 may include a step of calculating the weight for the output of the in-wheel motor depending on a preset formula ($Ax^a$) based on the calculated output of the in-wheel motor. At this time, 'x' may denote an output of an in-wheel motor; and, each of 'A' and 'a' may denote a value capable of being changed in response to the output of the in-wheel motor. The values of 'A' and 'a' respectively corresponding to outputs of in-wheel motors are implemented as a table, and may be values selected from the table depending on the output of the in-wheel motor.

The vehicle lateral-acceleration detecting step S444 may include a step of detecting the lateral-acceleration of a vehicle.

For example, the vehicle lateral-acceleration detecting step S444 may include a step of detecting the lateral-acceleration of a vehicle by using a lateral-acceleration sensor mounted in the vehicle.

The vehicle load detecting step S445 may include a step of detecting a load of the vehicle.

The turning force calculating step S446 may include a step of calculating the turning force of the vehicle based on the vehicle's lateral-acceleration detected in the vehicle lateral-acceleration detecting step S444 and the vehicle's load detected in the vehicle load detecting step S445.

For example, the turning force of the vehicle may increase as the lateral-acceleration of a vehicle increases, and the turning force of the vehicle may increase as the load of the vehicle increases. Accordingly, the turning force calculating step S446 may include a step of calculating the turning force of the vehicle by multiplying the lateral-acceleration of the vehicle and the load of the vehicle.

The turning force calculating step S446 may include a step of calculating a weight for the calculated turning force.

For example, the turning force calculating step S446 may include a step of calculating a weight for the turning force depending on a preset formula ($Ax^a$) based on the calculated turning force. At this time, 'x' may denote a turning force; each of 'A' and 'a' may denote a value capable of being changed in response to the turning force. The values of 'A' and 'a' respectively corresponding to turning forces may be implemented as a table, and may be selected from the table depending on the turning force.

The in-wheel output weight calculating step S447 may include a step of calculating an in-wheel output weight based on a weight for a torque of an in-wheel motor calculated in the in-wheel-applied-torque detecting step S441, a weight for an in-wheel motor output calculated in the in-wheel output calculating step S443, and a weight for the turning force calculated in the turning force calculating step S446.

For example, the in-wheel output weight calculating step S447 may include a step of calculating the in-wheel output weight by summing the weight for a torque of an in-wheel motor calculated in the in-wheel-applied-torque detecting step S441, the weight for an in-wheel motor output calculated in the in-wheel output calculating step S443, and the weight for the turning force calculated in the turning force calculating step S446.

The tire pressure monitoring method according to an embodiment of the present disclosure is summarized as follows.

The tire pressure monitoring method according to an embodiment of the present disclosure may estimates the necessary air pressure when a vehicle is started, may calculate a weight for each of a plurality of preset conditions (e.g., a temperature of an in-wheel motor, a rough road driving, a brake braking force, an output of the in-wheel, and the like) when the vehicle's driving state satisfies a tire pressure calculation condition, and may calculate a tire pressure based on the calculated weight. At this time, the reliability of tire pressure calculation may be improved by calculating the weight for each of the plurality of conditions.

Furthermore, the tire pressure monitoring method according to an embodiment of the present disclosure may notify a driver or passenger of a tire check by comparing the estimated necessary air pressure with the calculated tire pressure.

Besides, the tire pressure monitoring method according to an embodiment of the present disclosure may notify a driver or passenger of a vehicle check by comparing differences between tire pressures when a tire pressure is calculated for each tire mounted on a vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

Because the present technology does not require a sensor that directly senses a tire pressure, it may be possible to reduce the number of parts in a system for monitoring a tire pressure and to reduce the cost.

Besides, because the present technology uses an in-wheel drive device, it is possible to improve the convenience when an air pressure is monitored.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A tire pressure monitoring method, the method comprising:
    estimating a tire necessary air pressure based on a location and an external temperature of a vehicle;
    determining whether a change in a current applied to an in-wheel motor is included in a preset range when the vehicle is driving at a uniform speed during a preset time;
    calculating weights according to a plurality of conditions, respectively; and
    calculating a tire pressure based on the weights.

2. The method of claim 1, further comprising
    comparing the tire necessary air pressure estimated in the estimating of the tire necessary air pressure with the tire pressure calculated in the calculating of the tire pressure, and notifying a driver or a passenger of a vehicle air pressure check.

3. The method of claim 2, wherein the notifying of the driver or the passenger of the vehicle air pressure check includes
    comparing differences between tire pressures of the vehicle calculated in the calculating of the tire pressure, and notifying the driver or the passenger of the vehicle check.

4. The method of claim 1, wherein the estimating of the tire necessary air pressure includes:
    determining whether a latitude according to the location of the vehicle is included in a preset latitude range;
    determining whether the external temperature of the vehicle is within a preset temperature range;
    calculating a temperature correction coefficient depending on the external temperature when, in the determining of whether the latitude according to the location of the vehicle is included in the preset latitude range, the location of the vehicle is determined to be included in the preset latitude range, or when, in the determining of whether the external temperature of the vehicle is within the preset temperature range, the external temperature is determined to be included in the preset temperature range; and estimating the tire necessary air pressure by applying the calculated temperature correction coefficient to the external temperature when, in the calculating of the temperature correction coefficient, the temperature correction coefficient is calculated.

5. The method of claim 4, wherein the estimating of the tire necessary air pressure by applying the calculated temperature correction coefficient to the external temperature includes
estimating the tire necessary air pressure depending on the external temperature when, in the calculating of the temperature correction coefficient, the temperature correction coefficient is not calculated.

6. The method of claim 1, wherein the determining of whether the change in the current applied to the in-wheel motor is included in the preset range includes:
determining whether the vehicle is driving at the uniform speed while maintaining a preset number of revolutions of the in-wheel motor and a preset torque of the in-wheel motor during the preset time;
measuring the current applied to the in-wheel motor when, in the determining of whether the vehicle is driving at the uniform speed, a current measurement condition is satisfied such that the vehicle is determined to be driving at the uniform speed and the preset number of revolutions of the in-wheel motor and the preset torque of the in-wheel motor are determined to be maintained during the preset time; and
determining whether the change in the current measured in the measuring of the current applied to the in-wheel motor as compared to a reference current is included in the preset range.

7. The method of claim 1, wherein the calculating of the weights according to the plurality of conditions is a step performed when, in the determining of whether the change in the current applied to the in-wheel motor is included in the preset range, the change in the current applied to the in-wheel motor is determined to be out of the preset range while the vehicle is driving at the uniform speed during the preset time.

8. The method of claim 1, wherein the plurality of conditions in the calculating of the weights include
a temperature of the in-wheel motor, a rough road driving, a brake braking force, and an output of the in-wheel motor.

9. The method of claim 8, wherein the calculating of the weights includes:
calculating a weight for the temperature of the in-wheel motor;
calculating a weight for a current ripple of the in-wheel motor according to the rough road driving;
calculating a weight for the brake braking force; and
calculating a weight for the output of the in-wheel motor.

10. The method of claim 9, wherein the calculating of the weight for the temperature of the in-wheel motor includes
calculating a weight for a temperature increase of the in-wheel motor by comparing the external temperature of the vehicle with the temperature of the in-wheel motor.

11. The method of claim 10, wherein the calculating of the weight for the temperature of the in-wheel motor further includes:
receiving information about the external temperature;
calculating a weight for the information about the external temperature received in the receiving of the information about the external temperature;
receiving information about the temperature of the in-wheel motor;
calculating a difference between the temperature of the in-wheel motor and the external temperature and calculating a weight for the calculated difference; and
calculating a motor temperature weight based on the weight for the external temperature calculated in the calculating of the weight for the information about the external temperature and based on the weight calculated in the calculating of the difference between the temperature of the in-wheel motor and the external temperature and the calculating of the weight for the calculated difference.

12. The method of claim 9, wherein the calculating of the weight for the current ripple of the in-wheel motor according to the rough road driving includes:
determining whether the vehicle is driving on a rough road;
calculating a weight for the current applied to the in-wheel motor;
calculating a weight for a deviation of currents applied to in-wheel motors included in the vehicle;
calculating a weight for a speed ripple of the vehicle; and
calculating a rough road driving weight based on the weight calculated in the calculating of the weight for the current applied to the in-wheel motor, the weight calculated in the calculating of the weight for the deviation of the currents, and the weight calculated in the calculating of the weight for the speed ripple of the vehicle.

13. The method of claim 9, wherein the calculating of the weight for the brake braking force includes:
calculating a braking speed of the vehicle based on a speed before braking of the vehicle and a speed after braking of the vehicle;
detecting a braking time of the vehicle;
estimating a braking acceleration based on the braking speed and the braking time;
comparing the braking acceleration estimated in the estimating of the braking acceleration with an actual acceleration;
detecting a load of the vehicle; and
calculating a brake braking force weight based on the braking acceleration and the load of the vehicle.

14. The method of claim 9, wherein the calculating of the weight for the output of the in-wheel motor includes:
detecting a torque of the in-wheel motor;
detecting a speed of the vehicle;
calculating the output of the in-wheel motor based on the torque of the in-wheel motor and the speed of the vehicle;
detecting a lateral-acceleration of the vehicle;
detecting a load of the vehicle;
calculating a turning force of the vehicle based on the lateral-acceleration and the load of the vehicle; and
calculating an in-wheel output weight based on the torque of the in-wheel motor, the output of the in-wheel motor, and the turning force of the vehicle.

15. The method of claim 1, wherein the calculating of the tire pressure includes:
estimating a tire pressure reduction amount for a weight obtained by summing the weights calculated in the calculating of the weights according to the plurality of conditions; and
calculating a distance driven of the vehicle and a driving time of the vehicle to estimate a tire pressure reduction amount due to natural reduction.

16. The method of claim 8, wherein the calculating of the tire pressure includes:
- summing the weights calculated in the calculating of the weights according to the plurality of conditions;
- estimating a tire pressure reduction amount based on a weight summed in the summing of the weights;
- calculating a distance driven of the vehicle and a driving time of the vehicle;
- estimating a tire pressure reduction amount based on the distance driven of the vehicle and the driving time of the vehicle;
- calculating a tire pressure based on the tire pressure reduction amount estimated in the estimating of the tire pressure reduction amount based on the weight summed in the summing of the weights and based on the tire pressure reduction amount estimated in the estimating of the tire pressure reduction amount based on the distance driven of the vehicle and the driving time of the vehicle.

\* \* \* \* \*